(12) United States Patent
Fayyad et al.

(10) Patent No.: US 7,720,553 B2
(45) Date of Patent: May 18, 2010

(54) SERVICE METRIC PORTFOLIO MANAGEMENT

(75) Inventors: Bahaa Fayyad, Lago Vista, TX (US); Steve Godwin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 11/469,053

(22) Filed: Aug. 31, 2006

(65) Prior Publication Data

US 2008/0071389 A1      Mar. 20, 2008

(51) Int. Cl.
 *G05B 13/02* (2006.01)
(52) U.S. Cl. .............................. 700/51; 700/29; 700/33; 702/179
(58) Field of Classification Search ............. 700/1, 700/51, 108, 121, 29, 33; 702/84, 179
See application file for complete search history.

(56) References Cited

U.S. PATENT DOCUMENTS

| | | | | |
|---|---|---|---|---|
| 6,408,220 B1 * | 6/2002 | Nulman | ....................... | 700/51 |
| 6,532,427 B1 * | 3/2003 | Joshi et al. | ..................... | 702/84 |
| 6,560,503 B1 * | 5/2003 | Toprac et al. | ............... | 700/121 |
| 6,646,660 B1 * | 11/2003 | Patty | ........................... | 700/17 |
| 6,772,034 B1 * | 8/2004 | Shi et al. | .................... | 700/121 |
| 6,885,907 B1 | 4/2005 | Zhang et al. | ................ | 700/146 |
| 6,922,600 B1 | 7/2005 | Conrad et al. | ............... | 700/108 |
| 6,944,662 B2 | 9/2005 | Devine et al. | ............... | 709/225 |
| 2006/0245637 A1 * | 11/2006 | Prince | ........................ | 382/150 |

\* cited by examiner

*Primary Examiner*—Albert DeCady
*Assistant Examiner*—Steven R Garland
(74) *Attorney, Agent, or Firm*—Hamilton & Terrile, LLP; Stephen A. Terrile

(57) ABSTRACT

A system and method is disclosed for the automated real-time collection, extraction, transformation, analysis and presentation of statistical process control (SPC) information. One or more monitored systems or processes generate operational process control information that is stored in its native form. An SPC system iteratively accesses this information, transforms it as required, and performs statistical processing to generate database tables, control charts and other predetermined forms of data output. The statistical processing output is then extracted by an automated SPC data extraction system in real-time. The extracted data is placed in a data wrapper and submitted, likewise in real-time, to one or more statistical analysis systems or models, which process the data to derive new specification limits. The new specification limits are applied to monitored systems and processes resulting in the generation of new operational measurements, which are in turn collected and processed. The process continues to repeat automatically, providing a real-time view of trends for involved control metrics.

14 Claims, 4 Drawing Sheets

SERVICE METRIC PORTFOLIO MANAGEMENT

BACKGROUND OF THE INVENTION

1. Field of the Invention

The present invention relates in general to the field of statistical process control (SPC) and more specifically, to real-time analysis of SPC metrics.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Business and personal consumers alike are becoming more sophisticated. They demand the best quality at the lowest possible price, and many times, desire products that are custom-tailored to meet their needs. This has resulted in the growing popularity of mass customization, which has become especially popular when purchasing products such as user-configured information handling systems. At the same time, these consumers expect exemplary support and service, which can be challenging to deliver at marginal price points. Known approaches to achieving this goal include the use of stringent quality controls and performance monitoring of business processes.

In the past, quality control was achieved through inspection. Finished products were individually accepted or rejected based on their adherence to predetermined metrics. In contrast, statistical process control (SPC) uses statistical analysis to observe the performance of a process or production line to predict deviations that could result in unacceptable products or service. At its simplest, SPC uses statistical tools such as mean and variance to determine whether an observed process is performing within acceptable parameters. The underlying assumption is that any production process will result in slight variations, even when the process is running normally, and these variances can be statistically analyzed to maintain control of the process. These statistical analyses are typically depicted as graphical plots in a variety of control chart formats to facilitate human monitoring of the observed process.

Implementation of SPC can result in large volumes of process data being generated, many times across multiple systems. In many cases, this data is iteratively collected and aggregated into a centralized data store over a predetermined period of time. Then the data corresponding to desired metrics is extracted and provided as input to a SPC analysis system to identify trends, deviations or patterns. The results of the analysis are then reviewed and corrective actions taken if required. However, the collection, extraction and conversion of process control data for analysis often involve manual processes which can be lengthy, time consuming and inefficient. Furthermore, in many cases process control data is not available in real-time nor is all required information available concurrently. This lag in information availability can cause reactive decisions that are made based on lagging indicators (e.g., historical data and trends) rather than leading indicators. Predictive modeling of SPC analysis results is likewise impeded, which can hamper proactive efforts and make it difficult to determine the cause of quality issues. As a result, the inability to concurrently acquire process control data in real-time offsets the benefits of SPC analyses.

SUMMARY OF THE INVENTION

In accordance with the present invention, a system and method is disclosed for the automated real-time collection, extraction, transformation, analysis and presentation of statistical process control (SPC) information. In selected embodiments of the invention, one or more monitored information handling system generate operational process control information that is collected and stored in its native form. An SPC system iteratively accesses this information, transforms it as required, and performs statistical processing to generate database tables, control charts and other predetermined forms of data output familiar to those of skill in the art. This statistical processing output is then extracted at predetermined intervals by an automated SPC data extraction system. In one embodiment, extracts are performed in real-time or near-real-time as the statistical processing output becomes available. The extracted data is then placed in a data wrapper to facilitate transfer and acceptance by other systems. The statistical processing output is then submitted, likewise in real-time or near-real-time, to a statistical analysis system, which removes the data wrapper as necessary and performs statistical analysis processes. Analysis results are then programmatically compared to business rules tables by a rules-driven specification limit system and new specification limits are derived. The new specification limits are then applied to monitored systems and processes resulting in the generation of new operational measurements based on the new limits, which are in turn collected and processed. The process continues to repeat automatically, providing a real-time or near-real-time view of trends for involved control metrics.

In an embodiment of the invention, analysis results are respectively submitted in real-time or near-real-time to a predictive model and a resource model. The predictive model accepts predetermined data associated with real-time performance analysis metrics and processes the data to generate a predicted outcome based on observed variances, patterns and trends. The resource model similarly receives the same or different predetermined data associated with real-time performance analysis metrics and processes the data to generate its affect on available resources.

In an embodiment of the invention, the resulting output of the predictive and resource models is applied to an algorithm to determine, based on the severity of threshold metrics, which human operator or manager will implement corrective decisions. In another embodiment, the resulting output of the predictive and resource models is submitted to an automated process specification decision system, which automatically generates and enacts one or more specification limit decisions or closed-loop corrective actions (CLCAs). In yet another embodiment, the resulting output of the predictive and resource models is submitted to the automated process specification decision system which automatically generates one or more recommended specification limit decisions or CLCAs, which are then provided to a human operator or manager for enactment. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for the automated real-time collection, extraction, transformation, analysis and presentation of statistical process control (SPC) information. In selected embodiments of the invention, one or more monitored information system generate operational process control information that is stored in its native form. An SPC system iteratively accesses this information, transforms it as required, and performs statistical processing to generate database tables, control charts and other predetermined forms of data output. This statistical processing output is then extracted by an automated SPC data extraction system in real-time or near-real-time as the statistical processing output becomes available. The extracted data is then placed in a data wrapper and submitted, likewise in real-time or near-real-time, to one or more statistical analysis systems or models, which process the data to derive new specification limits. The new specification limits are then applied to monitored systems and processes resulting in the generation of new operational measurements, which are in turn collected and processed. The process continues to repeat automatically, providing a real-time or near-real-time view of trends for involved control metrics.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
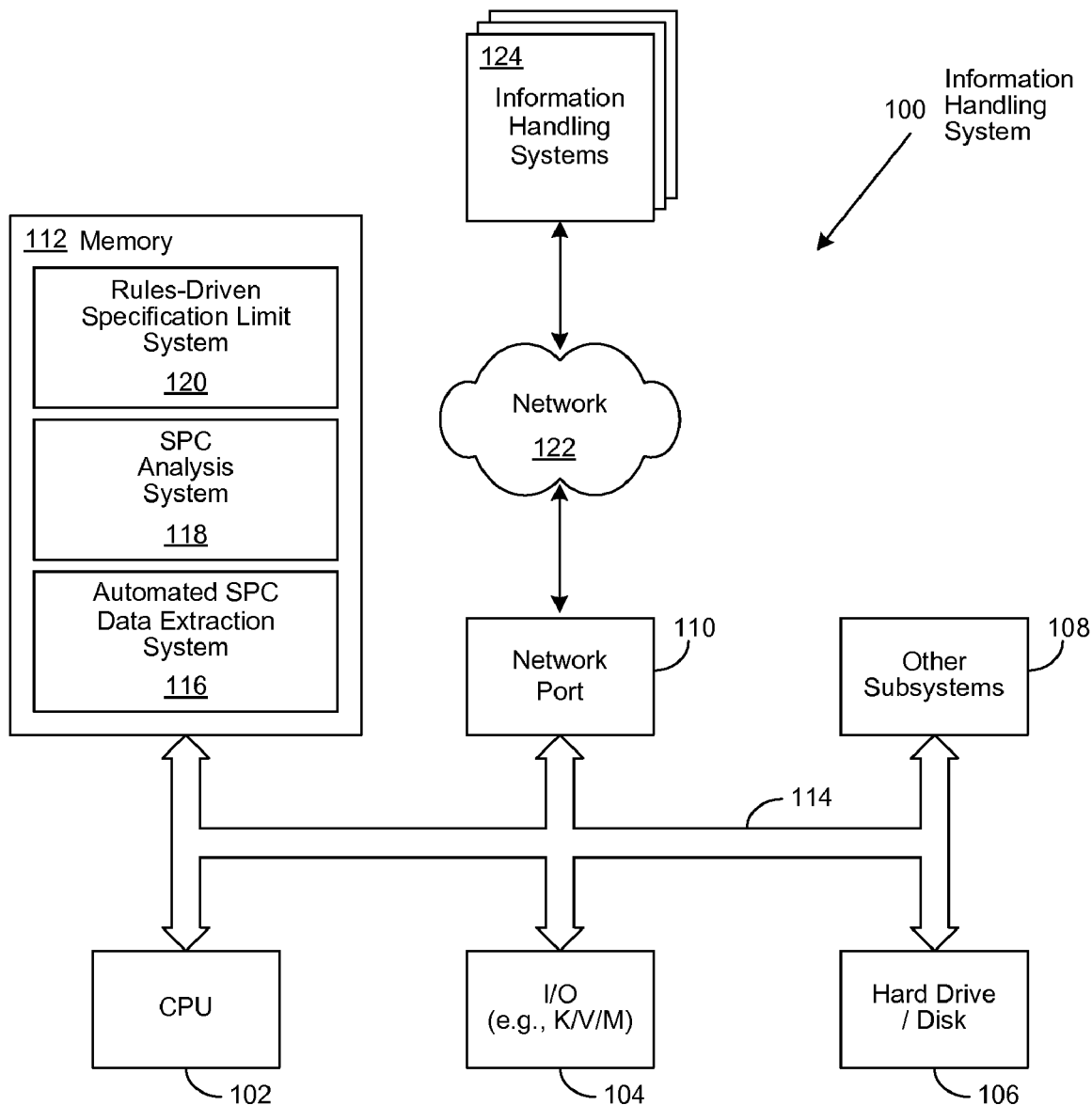
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110 operable to connect to a network 122 to access a plurality of information handling systems 124, and system memory 112, all interconnected via one or more buses 114. System memory 112 further comprises an automated statistical process control (SPC) data extraction system, a statistical analysis system 118, and a rules-driven control limit system 120.

Figure 2:
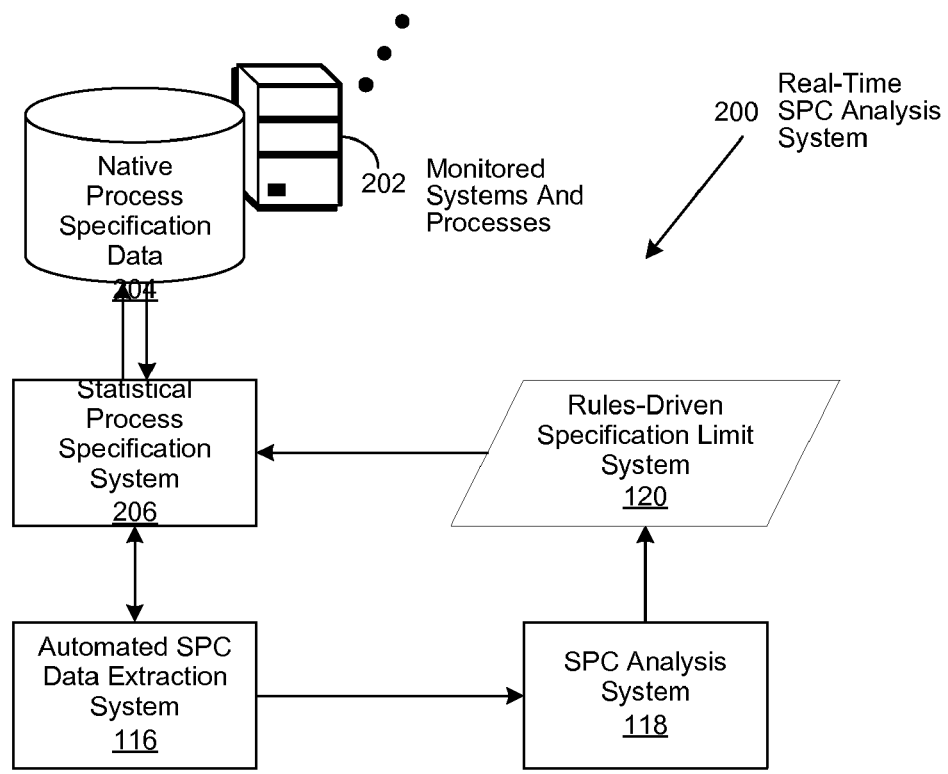
FIG. 2 shows a block diagram of a real-time statistical process control (SPC) analysis system.

FIG. 2 shows a block diagram of a real-time statistical process control (SPC) analysis system 200. In selected embodiments of the invention, one or more monitored information handling system 202 (which can include a process executing on the information handling system) generate operational process control information that is collected and stored in its native form in a data store 204. An SPC system 206 iteratively accesses this information in its native form, transforms it as required, and performs statistical processing to generate database tables, control charts and other predetermined forms of data output familiar to those of skill in the art. This statistical processing output is then extracted at predetermined intervals by automated SPC data extraction system 116. In one embodiment, extracts are performed in real-time or near-real-time as the statistical processing output becomes available. The extracted data is then placed in a data wrapper to facilitate transfer and acceptance by other systems.

SPC analysis system 118 accepts the statistical processing output, likewise in real-time or near-real-time, removes the data wrapper as necessary, and performs statistical analysis processes. Analysis results are then programmatically compared to business rules tables by rules-driven specification limit system 120 and new specification limits are derived. The new specification limits are then applied to monitored systems and processes 202, resulting in the generation of new operational measurements based on the new limits, which are in turn collected and processed by SPC system 206. The process continues to repeat automatically, providing a real-time or near-real-time view of trends for all involved control metrics.

Figure 3:
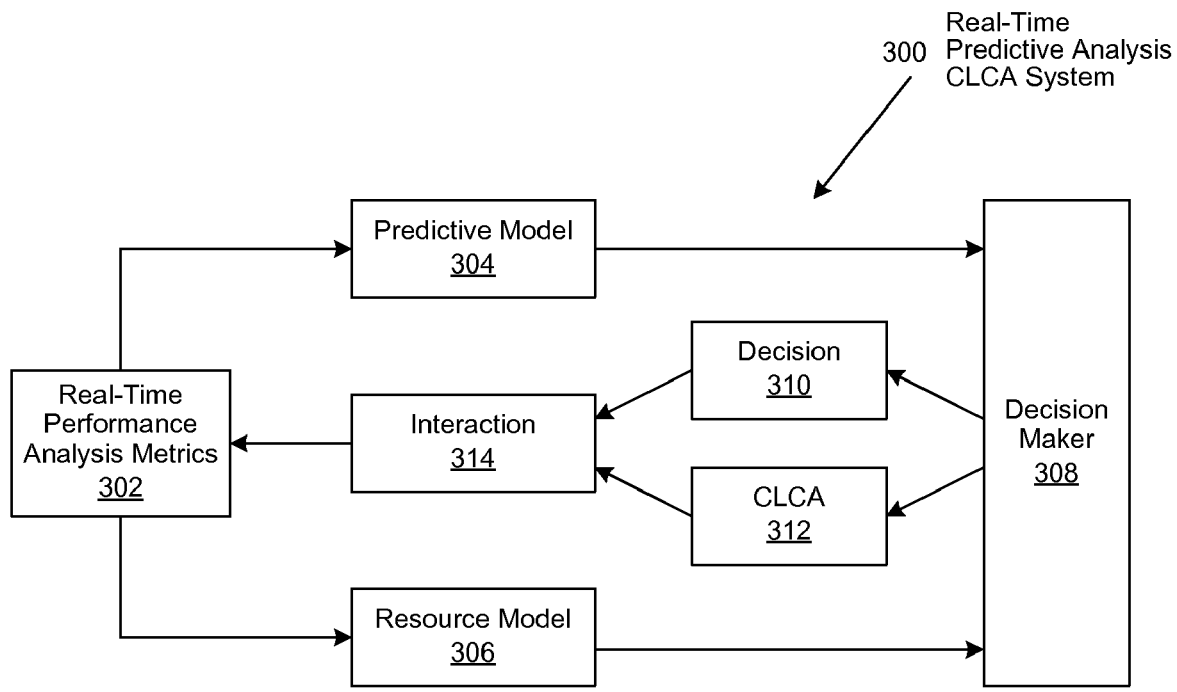
FIG. 3 shows a process flow diagram of a real-time, predictive analysis system implementing a closed-loop corrective action (CLCA) approach.

FIG. 3 shows a process flow diagram of a real-time, predictive analysis system 300 implementing a closed-loop corrective action (CLCA) approach. In selected embodiments of the invention, real-time performance analysis metrics 302 are generated as described in greater detail hereinabove. The output of this analysis is likewise submitted in real-time or near-real-time to a predictive model 304 and a resource model 306. In an embodiment of the invention, predictive model 304 accepts data associated with real-time performance analysis metrics 302 and processes the data to generate a predicted outcome based on observed variances, patterns and trends. Resource model 306 similarly receives the same or predetermined data associated with real-time performance analysis metrics 302 and processes the data to generate its affect on available resources. The resulting output of predictive model 304 and resource model 306 are submitted to a decision maker 308 which implements a decision 310 or closed-loop corrective action (CLCA) 312.

In one embodiment of the invention, the decision maker is a human operator or manager which manually enacts one or more decisions 310 or CLCAs 312. In another embodiment, the decision maker is a system for decision support or business process management, which generates one or more decisions 310 or CLCAs 312, which can be provided to a human operator for manual enactment. In yet another embodiment, the decision maker is a system for decision support or business process management, which automatically generates and enacts one or more decisions 310 or CLCAs 312. Decisions 310 and CLCA 312 result in interaction 314 with the monitored process, which results in the ongoing production of real-time performance analysis metrics 302.

Figure 4A:
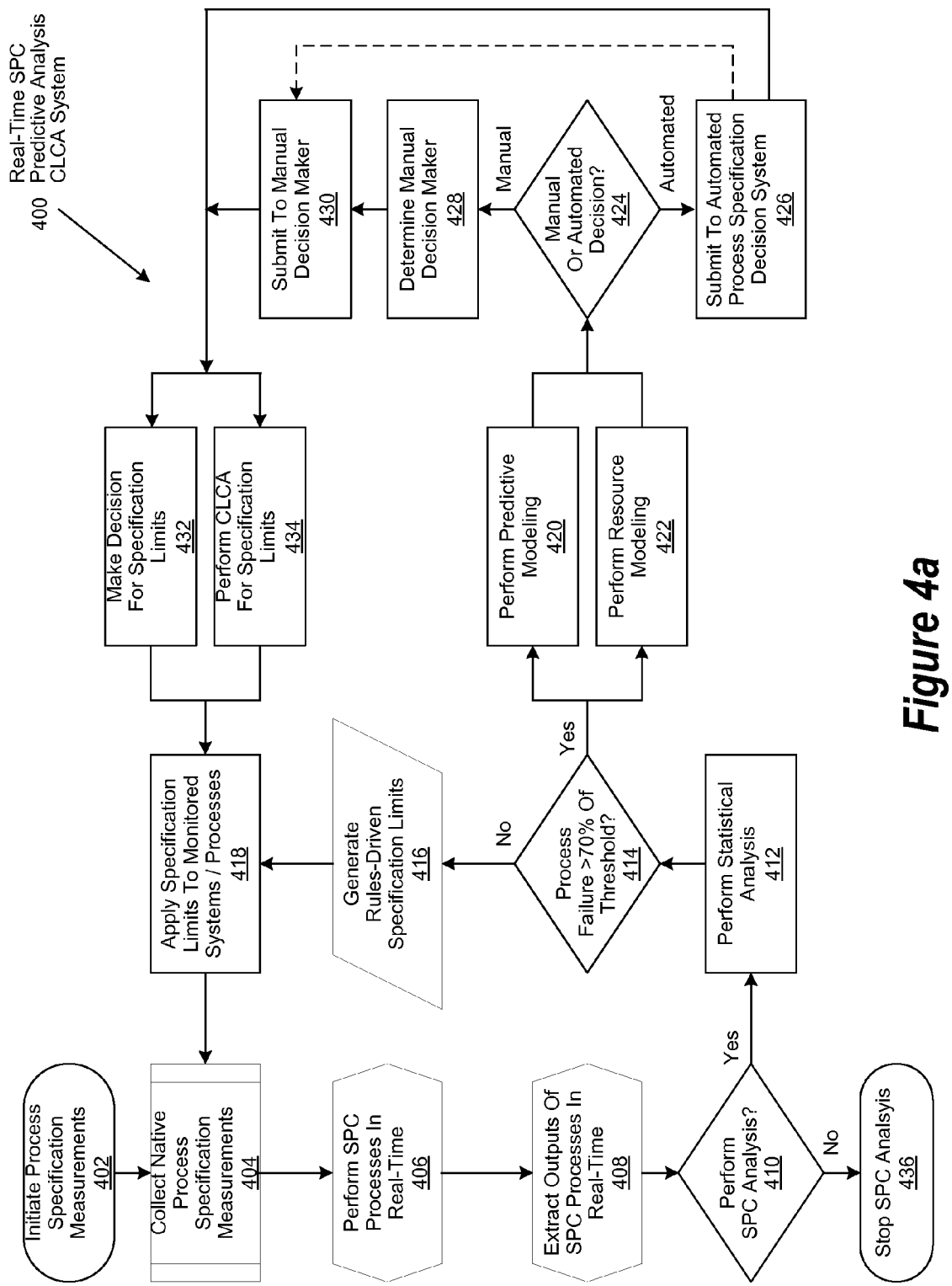
FIGS. 4a-b show a generalized flowchart of a real-time SPC predictive analysis system implementing a closed-loop corrective action system.
Figure 4B:
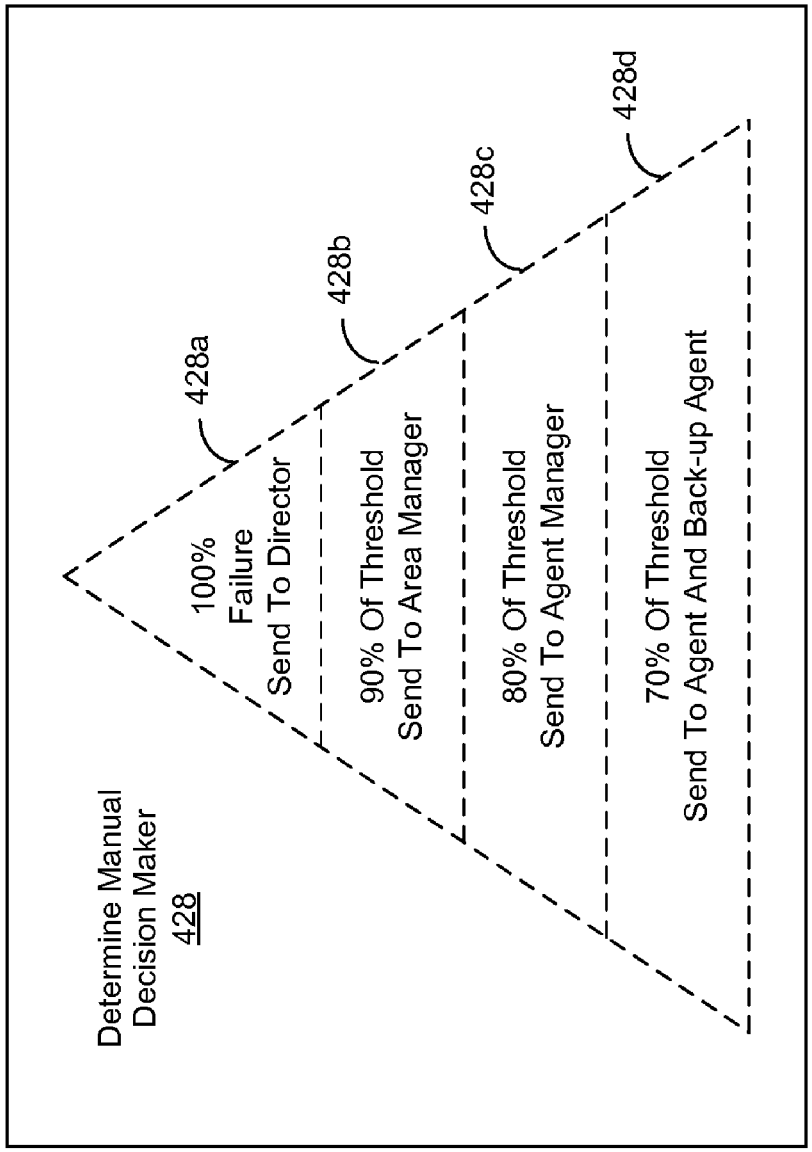

FIGS. 4*a-b* show a generalized flowchart of a real-time SPC predictive analysis system 400 depicting a closed-loop corrective action system as implemented in an embodiment of the invention. In this embodiment, process control measurements are initiated in step 402 with one or more monitored information handling systems or processes, which generate operational process control measurements that are collected and stored in their native format in step 404. The operational measurements are iteratively accessed by at least one SPC process in step 406, which transforms the operational measurements as required and performs statistical processing in real-time to generate database tables, control charts and other predetermined forms of data output. This statistical processing output is then extracted at predetermined intervals by an automated SPC data extraction system in step 408. In one embodiment, extracts are performed in real-time or near-real-time as the statistical processing output becomes available. After its collection, the extracted data is then placed in a data wrapper to facilitate transfer and acceptance by other systems.

If it is determined in step 410 to cease SPC analysis, then SPC analysis processes are stopped in step 436. Otherwise, a statistical analysis system accepts the statistical processing output from step 408, likewise in real-time or near-real-time, removes the data wrapper as necessary, and performs statistical analysis processes in step 412. If it is determined in step 414 that the statistical analysis performed in step 412 indicates that a predetermined metric is below a predetermined threshold (e.g., <70%), then the analysis results are programmatically compared to business rules tables by a rules-driven specification limit system in step 416 and new specification limits are derived. The new specification limits are then applied to monitored systems and processes in step 418, resulting in the generation of new operational measurements based on the new limits, which are in turn collected in step 404. The process continues to repeat automatically providing real-time or near-real-time view of trends for all involved control metrics.

If it is determined in step 414 that the statistical analysis performed in step 412 indicates that a predetermined metric is above a predetermined threshold e.g., >70%), then analysis results are respectively submitted in real-time or near-real-time to a predictive model in step 420 and a resource model in step 422. In an embodiment of the invention, the predictive model accepts predetermined data associated with real-time performance analysis metrics and processes the data to generate a predicted outcome based on observed variances, patterns and trends. The resource model similarly receives the same or different predetermined data associated with real-time performance analysis metrics and processes the data to generate its affect on available resources.

If it is determined in step 424 that automated process control decisions are to be implemented, then the resulting output of the predictive and resource models is submitted to an automated process control decision system in step 426. In an embodiment of the invention, automated process control decisions are made by a system implemented for decision support or business process management. These systems automatically generate and enact one or more specification limit decisions in step 432 or CLCAs in step 434. The new specification limits are then applied to monitored systems and processes in step 418, resulting in the generation of new operational measurements based on the new limits, which are in turn collected in step 404. The process continues to repeat automatically providing real-time or near-real-time view of trends for all involved control metrics.

If it is determined in step 424 that a human operator or manager will manually implement process control decisions, then the manual decision maker to receive the resulting output of the predictive and resource models is determined in step 428. In an embodiment of the invention, the resulting output of the predictive and resource models is applied to an algorithm to determine the decision maker based on the severity of threshold metrics. In this embodiment, if the threshold metric is greater than 70% but less than 80%, the results are sent to an agent and a back-up agent 428*d*, and if the threshold metric is greater than 80% but less than 90%, the results are sent to an agent manager 428*c*. Similarly, if the threshold metric is greater than 90% but less than 100%, the results are sent to an area manager 428*b*, but if the threshold metric reaches 100%, the results are sent to a director 428*a*.

In an embodiment of the invention, the resulting output of the predictive and resource models is submitted to the automated process control decision system in step 426. The system then automatically generates one or more recommended specification limit decisions or CLCAs, which are then provided in step 430 to a human operator or manager for enactment. The human operator or manager then manually enacts one or more specification limit decisions in step 432 or CLCAs in step 434. The new specification limits are then applied to monitored systems and processes in step 418, resulting in the generation of new operational measurements based on the new limits, which are in turn collected in step 404. The process continues to repeat automatically providing real-time or near-real-time view of trends for all involved control metrics.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for communicating information between a plurality of information handling systems, comprising:
    a plurality of monitored information handling systems;
    a statistical process control (SPC) system operable to collect operational process control information from the plurality of monitored information handling systems and generate one or more predetermined data outputs;
    an automated SPC data extraction system operable to iteratively extract the data outputs from the SPC system in a native form as the data outputs become available, the automated SPC data extraction system placing the extracted data outputs extracted in data wrappers, the data wrappers operable to facilitate transfer and acceptance of the extracted data by other systems;
    an SPC analysis system operable to use the extracted data outputs to generate analytics enabling real-time adaptation to changes in the behavior of the plurality of monitored information handling systems and processes, and;

an automated specification limit decision system operable to generate process specification limits, the process specification limits implemented on the plurality of monitored information handling systems, the process specification limits generated by the automated specification limit decision system comprising a closed-loop corrective action (CLCA).

2. The system of claim 1, wherein the predetermined data outputs of the SPC system is extracted in real-time by the automated SPC data extraction system.

3. The system of claim 1, wherein the analytics generated by the SPC analysis system enable an operator to implement one or more process specification limit decisions.

4. The system of claim 1, wherein the SPC analysis system comprises a rules-driven system.

5. The system of claim 1, wherein the SPC analysis system comprises a predictive model.

6. The system of claim 1, wherein the SPC analysis system comprises a resource model.

7. The system of claim 1, wherein the automated specification limit decision system is operable to generate one or more recommendations enabling a human operator to implement one or more process control limit decisions.

8. A method for communicating information between a plurality of information handling systems, comprising:

monitoring a plurality of monitored information handling systems;

collecting operational process control information from the plurality of monitored information handling systems via a statistical process control (SPC) system generating one or more predetermined data outputs via the SPC system based upon the operational process control information;

iteratively extracting the data outputs from the SPC system as in a native form as the data outputs become available via an automated SPC data extraction system, the automated SPC data extraction system placing the extracted data outputs extracted in data wrappers, the data wrappers operable to facilitate transfer and acceptance of the extracted data by other systems;

using the extracted data outputs to generate analytics enabling real-time adaptation to changes in the behavior of the plurality of monitored information handling system via an SPC analysis system, and;

generating process specification limits, the process specification limits implemented on the plurality of monitored information handling systems via an automated specification limit decision system, the process specification limits generated by the automated specification limit decision system comprising a closed-loop corrective action (CLCA).

9. The method of claim 8, wherein the predetermined data outputs of the SPC system is extracted in real-time by the automated SPC data extraction system.

10. The method of claim 8, wherein the analytics generated by the SPC analysis system enable an operator to implement one or more process specification limit decisions.

11. The method of claim 8, wherein the SPC analysis system comprises a rules-driven system.

12. The method of claim 8, wherein the SPC analysis system comprises a predictive model.

13. The method of claim 8, wherein the SPC analysis system comprises a resource model.

14. The method of claim 8, wherein the automated specification limit decision system is operable to generate one or more recommendations enabling a human operator to implement one or more process specification limit decisions.

* * * * *